US005401561A

United States Patent [19]

Fisun et al.

[11] Patent Number: 5,401,561

[45] Date of Patent: Mar. 28, 1995

[54] BASIC COMMODITY OR COLLECTOR'S OBJECT WITH IDENTIFICATION LABEL

[75] Inventors: Oleg I. Fisun; Lev N. Lupichev; Viktor V. Maklakov, all of Moscow, Russian Federation; Richard Schimko, Berlin, Germany

[73] Assignee: BORUS Spezialverfahren und -geräte im Sondermaschinenbau GmbH, Berlin, Germany

[21] Appl. No.: 117,833

[22] Filed: Sep. 8, 1993

[30] Foreign Application Priority Data

Sep. 8, 1992 [DE] Germany ........................ 42 30 548.9

[51] Int. Cl.[6] ............................................ B32B 9/00

[52] U.S. Cl. ................................... 428/195; 428/29; 428/87; 428/192; 428/201; 428/206; 428/207; 428/212; 428/913; 428/915; 219/121.6; 235/468; 235/487; 283/86; 283/91; 283/92; 283/72; 283/109; 283/901

[58] Field of Search ................. 428/690, 913, 87, 192, 428/201, 913, 212, 207, 29, 915; 283/901, 72, 86, 92, 109, 91

[56] References Cited

U.S. PATENT DOCUMENTS 5,300,764 4/1994 Hoshino et al. ..................... 235/487

FOREIGN PATENT DOCUMENTS

| | | |
|---|---|---|
| 2560119 | 8/1985 | France . |
| 1696714 | 12/1970 | Germany . |
| 3411797 | 10/1985 | Germany . |
| 3723856 | 1/1989 | Germany . |
| 3147385 | 9/1990 | Germany . |
| 4008398 | 9/1991 | Germany . |

*Primary Examiner*—Patrick J. Ryan
*Assistant Examiner*—Abraham Bahta
*Attorney, Agent, or Firm*—Spencer, Frank & Schneider

[57] ABSTRACT

Basic commodity or collector's object in particular of a high replacement or collector's value with an identification label, whereby the identification label is formed in material of the object itself as an optical mark which is not visible if illuminated with a light source with a wavelength range within the sensitivity range of the human eye but is visible to the human eye if illuminated with a light source outside this sensitivity range the label being situated in an area of a housing surface or other area of the which is optically transparent for at least a part of the wavelength range within the sensitivity range of the human eye and for an additional wavelength range which is outside the sensitivity range of the human eye and which is used to read the label, whereby the undamaged nature of the area is at least to a high degree important when evaluating the replacement or collector's value.

17 Claims, 1 Drawing Sheet

BASIC COMMODITY OR COLLECTOR'S OBJECT WITH IDENTIFICATION LABEL

BACKGROUND OF THE INVENTION

The invention relates to an object of high replacement value or a collector's item with an identification label.

High class basic commodities and works of art are often given identification labels which are unique and which make it possible to identify the object or determine the owner, These identification labels often are sequences of digits or characters which are on or imprinted on labels or signs, The disadvantage with this is that the labels can either be removed easily or are so tightly connected to the object that the labeled object is no longer unblemished and its collector's value or value of use is diminished.

A labeling method is disclosed in FR 2 560 119 B1 (French patent specification) which utilizes a so-called stream-laserhead. The object to be labeled is carried via a conveyor belt in front of the stream-laser printhead. The laserhead is positioned and moved by a device which is controlled by a microprocessor in order to sequentially create a prescribed writing pattern. For example the position of a number of prescribed letters and digits are thereby defined by their coordinates. Three photoelements control the position of the object to be labeled on the conveyor belt. When the object has reached a certain position the stream-laser printhead activates and puts the labels onto the surface material dot by dot.

With this method labels are created which are clearly visible and therefore forgeable and which also impair the optical impression of the surface of the object.

A method to label plastic parts is disclosed in DE 34 11 797 A1 (German Offenlegungsschrift) with which visible labels (for example non-erasable key inscriptions) are written into a laser light absorbing plastic layer under a transparent layer by a laser beam.

A method to label laminated glass panes is disclosed in DE 31 47 385 C2 (German Patent) with which by using a laser beam a visible label is written into the intermediate layer of a laminated glass which has a different absorption coefficient for the laser radiation than the glass.

These two labeling methods can also only be used for certain objects and are only to a certain degree forgery-proof due to the visibility of the labels for all.

A method to identify objects which have been mislaid is disclosed in DE 37 23 856 A1 (German Offenlegungsschrift) which uses three different labels of which two labels are only perceptable in UV-light and the third is of the usual type.

This method does not seem to be very practical due to the large amount of labeling and identification work and the crucial three labels are no more forgery-proof than any other usual label.

In all cases the labels do not or only partly fulfill the function required of them.

SUMMARY OF THE INVENTION

The object of the invention is therefore to provide an object as described with a label which on the one hand does not impair the value of the object either during its application or during the reading of it and in addition is not removable from the object without damaging it.

The above and other objects are accomplished in accordance with the invention by the provision of a basic commodity or collector's object in particular of a high replacement or collector's value with an identification label wherein the identification label is formed in the material of the object itself as an optical mark which is not visible if illuminated by a light source with a wavelength range within the sensitivity range of the human eye but is visible to the human eye if illuminated by a light source outside this sensitivity range, the label being situated in an area of a housing, surface or other area of the object which is optically transparent for at least a part of the wavelength range within the sensitivity range of the human eye and for an additional wavelength range which is beyond the sensitivity range of the human eye and which is used to read the label, and that the mark is situated in a region of the object where the undamaged nature of the area is important when evaluating the replacement or collector's value.

The invention includes the idea that an additional safety measure for the object to be labeled is connected to the fact that if the object loses its value not with the application of the label but with the attempt to remove the label then any unrightful owner or user who could be interested in removing the label will refrain from doing so. This can be the case with theft when the label serves to individualise the labeled object or helps to secure existing rights with an owner label. It can also be used to trace the route that the object has taken until it is sold to the end consumer.

Such a label is very effective in a transparant area of the surface of the object to be labeled as the attempt to remove the label would lead to noticeable damage. Transparent areas are used for optical reasons—if for example one should look into or through the object or if in the case of transparent gems refraction and reflection effects are to be used. In any case the resulting optical impairment on damaging or destructing the area in question leads to a value deduction which would be an obstacle when deciding whether to remove the label. This obstacle will therefore at least indirectly play a role for the decision of a person who would want to persue unlawful or dishonest dealings by removing the label.

In addition an important advantage of the solution according to the invention is that it is not possible to ascertain where the label has been applied to the object so that just for this reason the attempt to remove it would not be successful without a great effort.

As the identification label is in the form of an optical marker which is not visible when illuminated with a light source with a wavelength range within the sensitivity range of the human eye and which is transparent in at least one part of the wavelength range within the sensitivity range of the human eye so that the object remains transparent in the area but can be colored or opaque. In order to read the label with appropriate devices, the area is transparent for a further wavelength range outside the sensitivity of the human eye.

With high-quality consumer goods, especially in the photo-video-/electronics area the transparent element to be labeled is the cover of a light-emitting or a light-receiving element or an element which forms an optical control display which is preferably situated on the front face or in the viewing area of the finder as trying to remove the label by removing some of the material would be very noticeable.

The same is true for the screen area of a computer or other calculators with screen display, especially when these are connected to the computer unit as for example is the case with a computer of the laptop, notebook or palmtop type. The same is true for computers where the display also functions as the input device by local pressure. In the case of video or other picture or text replay devices the transparent part of the display can be the front face of a cathode beam tube or of a LCD- or plasmascreen.

The object can in a preferred embodiment also be a wrist watch and the transparent area is the cover for the watch face or some other time display. Trying to remove the label would also be extremely disturbing in appearance. Boring through or diminishing the thickness of the watch glass would lower the mechanical stability so that it can break or another characteristic—for example the water or pressure proofness—can no longer be guaranteed.

It is also possible to use the invention on cover glasses made from transparent plastic. It is especially advantageous if the transparent area is connected to the rest of the object by way of bonding, welding or the like and is not non-destructably detachable so that the removal or replacement of the transparent area together with the label cannot lead to the label being removed without the use or value of the object being impaired.

The inventive collector's item with identification label can be a precious stone or piece of jewelry—as for example an uncut or cut diamond for which a non-visible label can be of great economical benefit.

Furthermore it could also be a piece of art—a valuable painting for example—where the paint layer or another valuable surface area can be used as the labeling area. With the method according to the invention it is particularly advantageous that neither the surface of the material of the object to be treated nor its structure is damaged. Especially the undamaged nature of the area of the label is important when evaluating the replacement or collector's value.

Thereby it is achieved that expensive objects such as works of art are not damaged and therefore do not suffer a loss in value. This is a significant advantage in comparison with labeling methods which use x-rays, whereby the object to be labeled has to be combined with elements which are impermeable towards x-rays and which cannot be inserted into the material without damaging it. Due to the undamaged surface the position of the label is also not ascertainable by detailed viewing of the surface structure—such as gloss or roughnesses.

The wavelength to be chosen for the radiation depends on the molecular structure of the material and is determined experimentally prior to the utilization of the first preferred method for creating a label by determining the absorption of material over a wide enough wavelength range by means of one or more light sources which can be tuned or at least altered with respect of their emitted radiation wavelength. If a number of absorption maxima or resonance wavelengths are determined the most distinct or a maximum near to the working wave-length of a labeling light source is used for the labeling-radiation, whereby it must be guaranteed that the chosen wave length also lies in the working range of the light device(s) later used to read the labels.

It is further necessary to first of all, at least in material respective trials, to determine the optimal effective energy input with which the wanted irreversible change of the molecular excitation states or the microstructure takes place but at which no thermally caused permanent alteration of the mechanical characteristics or texture of the material has taken place.

The creation of labels then takes place with high energy light, preferably with coherent high energy impulse radiation (laser radiation) with a wave-length in the range of a resonance absorption and with a beam speed and beam parameters which provide the required value of the effective energy input.

With an advantageous embodiment of the method according to the invention on radiation of the object to be labeled the heat energy created in the material is partially removed or the object is cooled down prior to the radiation to such an extent that the radiated areas can only heat up to such a temperature at which a substantial permanent change of the material due to the radiated or created heat energy can be safely prevented.

By this feature it may be achieved that apart from the intended label no other clue as to the existence of a label is visible, so that it cannot be found without the use of additional technical devices.

The labeling is carried out in particular with laser radiation with a wavelength which is tuned to a resonance maximum in the range from 250 to 450 nm—for example using a nitrogen-, excimer- or dye-laser. In so far as resonance maxima exist in the UV/A-range, that is above approx. 300 nm, this range is preferentially used for labeling due to the availability of inexpensive and simple to use light sources. By varying the voltage of the impulse-after-frequency of the pump laser with an excimer laser, the local staying time or writing speed and/or the spot diameter of the laser beam and the radiation energy of the laser beam can be set taking into account the possibly required intended cooling so that the local effective energy input exceeds a threshold value necessary for the creation of a permanent label and whereby the heat energy balance is set such that by taking into account the heat removal the local temperature stays under a temperature at which a substantial permanent deformation or other change of the material of the object to be treated takes place.

The created label is made visible or read by a lighting system with a light wavelength near the resonance absorption wavelength of the labeled material. The visibility may also be based on a change of transparency of the area irradiadiate by radiation non visible to the human eye. This means that the encoding may appear as an opaque marking.

In accordance with the material used the label can advantageously be light on a dark background or dark on a light background.

In particular when using light of a relatively short wavelength it is practical or even necessary to radiate the object through a stencil in order to form the label. Metal stencils are possible.

If the label is created using a resonance wavelength in the UV-range reading it is easy using a simple broadbanded UV-light source (dark spot). With this the special effect occurs that in the case of whitish or light object material when shone through or in some cases also by the presence of whitish materials in the object area the label "modulates" the fluorescence behavior of the object or of the other materials. In that way the label is easily made visible for the human eye even though the label light and the illumination light are not in the visible wavelength ranges.

With another advantageous further embodiment of the method according to the invention the label is applied in coded form by using holographic methods whereby the reading of the thus created coded label can also take place with coherent radiation. A direction dependent analysis of the label is then also possible, so that for a possible encoding the direction information for coding is, in addition, also available.

BRIEF DESCRIPTION OF THE DRAWINGS

Further advantageous embodiments of the invention will be described in greater detail below together with the description of the preferred embodiments of the invention as shown in the figures. They show.

DETAILED DESCRIPTION OF THE PREFERRED EMBODIMENTS

Figure 1:
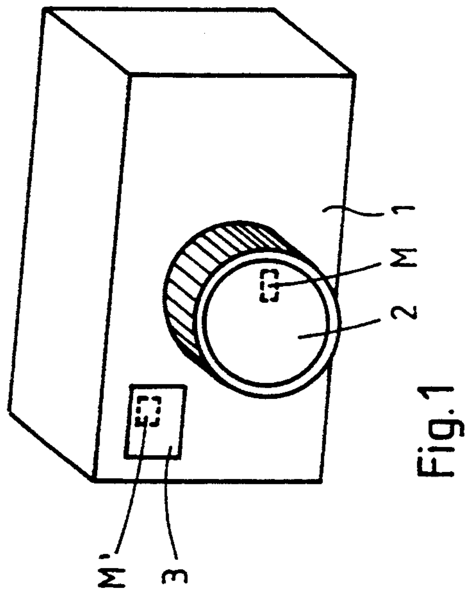
FIG. 1 a first embodiment of the invention in the form of a video camera.

The object shown in FIG. 1 is a camera 1 whose identification label is formed as an optical mark M which is not visible if illuminated with a light source with a wavelength range within the sensitivity range of the human eye. The front lens of objective 2 is the area which is optically transparent for at least a part of the wavelength range within the sensitivity range of the human eye and for an additional wavelength range which is outside the sensitivity range of the human eye and which is used to read the label. The label can be applied to the front glass of the finder 3 as an alternative; this label is denoted in the Figure with M'.

That the finder or the lenses are undamaged is very important for a video camera or a camera as their usefulness would be greatly reduced if one tried to remove the label which is invisible for the human as their optical characteristics would get worse. In addition, a damaged lens is very annoying. This is especially the case with mirror reflex cameras as the lens is also used as the viewer finder.

The label M or M' of the camera—as well as the labels of the other objects described below—is created by local radiation with laser light using a wavelength which is close to a resonance wavelength of the material of the optical glass and which lies outside the visible range, whereby the radiation is of such a set intensity that on the one hand a permanent label M or M' is created which when illuminated with light of the appropriate wavelength has an altered optical effect in the visible and/or non-visible light range in comparison with the effect of the areas of the front lens which were not radiated.

Figure 2:
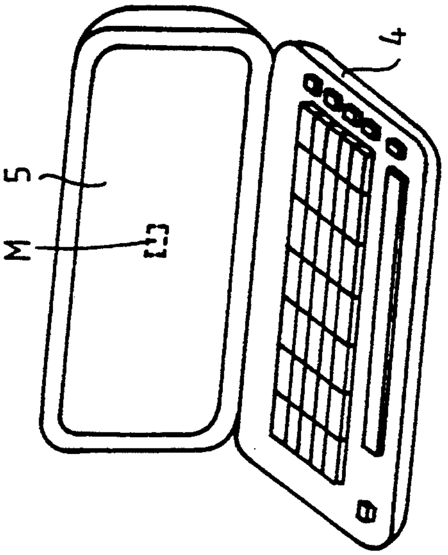
FIG. 2 a second embodiment of the invention realized by a portable computer.

The embodiment shown in FIG. 2 is a portable computer 4, in which the transparent area is the front glass of the screen or the display 5. The screen and the processor parts of most portable computers are firmly connected so that damaging the screen display when trying to remove the invisible label M greatly reduces its use. As in addition the miniaturized computers are mostly more expensive than table computers and when used during travel are more at risk of being stolen it is of significant importance that the individualized label cannot be removed without damaging the computer. Most portable computers are those in laptop, notebook or palmtop housing, whereby in order to do away with the keyboard the screen is preferably constructed to act as an input device which reacts to local pressurization.

Figure 3:
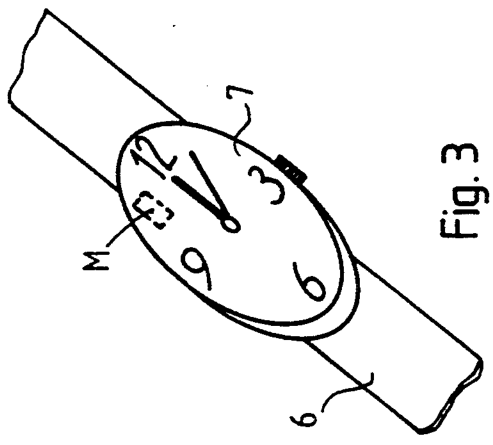
FIG. 3 a third embodiment of the invention in the form of a wrist watch.

The embodiment shown in FIG. 3 is a wrist watch 6, in which the transparent area carrying the invisible label M acts as a cover glass 7 for the watch face or another time display. The shown watch is waterproof up to a certain threshold pressure whereby the cover glass 7 forms a part of the water-proof housing surrounding the watch. Not only would the outer surface of the watch be damaged if it were tried to remove the label but its pressure-proofness would also be diminished which would impair its actual use. The cover glass 7 is connected with the other parts of the watch monolithically so that a replacement of the glass is not possible without damaging the housing.

Figure 4:
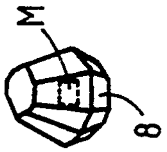
FIG. 4 a fourth embodiment of the invention in the form of a cut diamond.

The whole surface of the cut diamond 8 shown in FIG. 4 acts as the transparent area which holds the label M.

The label cannot be removed from the stone without a considerable loss in its value as it would have to be cut again and would lose a lot of its size.

Works of art like paintings, porcelain and the like can also be guarded against loss by labeling using the inventive method as the integrity of the surface is regarded to be a sign of its quality. With porcelain a damaged surface on the underside is generally regarded to be a sign for a low quality assortment. A damaged upper decoration would not be acceptable to the serious collector and an invisible owner label if situated there could not be removed without damaging it so that it is a good theft safeguard.

The present invention is not limited in its embodiments to the above-described preferred embodiments. Rather, a number of variations are conceivable which make use of the described solution even for very different configurations.

We claim:

1. Basic commodity or collector's object in particular of a high replacement or collector's value with an identification label, the improvement wherein: the identification label is formed in material of the object itself as an optical mark which is not visible if illuminated by a light source with a wavelength range within the sensitivity range of the human eye but is visible to the human eye if illuminated by a light source outside this sensitivity range, the label being situated in an area of a housing, surface or other area of the object which is optically transparent for at least a part of the wavelength range within the sensitivity range of the human eye and for an additional wavelength range which is beyond the sensitivity range of the human eye and which is used to read the label, and that the mark is situated in a region of the object where the undamaged nature of the area is important when evaluating the replacement or collector's value.

2. Object according to claim 1, wherein the visibility of the optical mark to the human eye if illuminated by a light source outside it's sensitivity range, is due to a change of transparency within at least a part of the wavelength range within this sensitivity range.

3. Object according to claim 1, wherein the transparant area is situated in the transparent cover of a light-emitting, light-receiving or an optical control display element.

4. Object according to claim 1, wherein the transparent area is a screen of a computer, in particular in a laptop, notebook or palmtop housing or it is a screen which also acts as the input surface by local pressurization, or that the transparent area is the front lens or another outer cover glass of the objective or of the finder of a photo, film or video camera.

5. Object according to claim 1, wherein the transparent area is the clock face or any other covering glass face of a watch, in particular a wrist watch.

6. Object according to claim 1, wherein the transparent area is a viewing glass of a cathode ray tube, of an LCD- or plasma screen.

7. Object in according to claim 1, wherein the transparent areas are part of a water-tight housing of an object which is not water-proof but which is to be used under water.

8. Object according to claim 1, wherein the object is a gem, in particular uncut or cut diamonds or a part of a piece of jewelry.

9. Object according to claim 1, wherein the area is the paint layer of a painting or any other surface area of a work of art.

10. Object according to claim 1, wherein the transparent area is part of the packaging of a cosmetic product, in particular an area of a perfume flacon.

11. Object according to claim 1, wherein the transparent area is a part of a sound or picture data carrier, in particular a video- or audiocassette, compact or mini disc or a slide or its packaging.

12. Object in according to claim 1, wherein the transparent area is not without destruction detachably connected to the rest of the object by bonding, welding or the like.

13. Object according to claim 1, wherein the label is an area whose microstructure has been changed irreversibly by localized radiation of the object using energy rich radiation with a wavelength close to a resonance wavelength of the material and that the area when illuminated with light of an appropriate wavelength has an altered optical effect in the visible and/or invisible light range by comparison with the effect of the not radiated neighboring regions but that the area has not been permanently substantially altered externally.

14. Object according to claim 1, wherein the label is a region which has been microstructurally altered by a molecular excitation in conjunction with an ionizing UV-laserbeam in particular in the wavelength range between 150 and 450 nm.

15. Object according to claim 1, wherein the label is visible to the eye when illuminated with light in the UV-range.

16. Object according to claim 1, wherein the label has a different reflection for occurring light with respect to the surrounding material of the object.

17. Object according to claim 1, wherein the label has a different fluorescence with respect to the surrounding material of the object.

* * * * *